(12) United States Patent
Leng et al.

(10) Patent No.: US 10,225,076 B2
(45) Date of Patent: Mar. 5, 2019

(54) SPLITTING DIGITAL PROMISES RECORDED IN A BLOCKCHAIN

(71) Applicants: Tianqing Leng, Kunming (CN); Tianhui Leng, Kunming (CN)

(72) Inventors: Tianqing Leng, Kunming (CN); Tianhui Leng, Kunming (CN)

(*) Notice: Subject to any disclaimer, the term of this patent is extended or adjusted under 35 U.S.C. 154(b) by 226 days.

(21) Appl. No.: 15/436,187

(22) Filed: Feb. 17, 2017

(65) Prior Publication Data
US 2018/0241546 A1    Aug. 23, 2018

(51) Int. Cl.
H04L 9/06 (2006.01)
G06Q 20/38 (2012.01)
G06Q 20/02 (2012.01)

(52) U.S. Cl.
CPC .......... H04L 9/0637 (2013.01); G06Q 20/02 (2013.01); G06Q 20/027 (2013.01); G06Q 20/38215 (2013.01); H04L 2209/20 (2013.01)

(58) Field of Classification Search
CPC ............... G06Q 20/02; G06Q 20/027; G06Q 20/38215; H04L 9/0637; H04L 2209/20
See application file for complete search history.

(56) References Cited

U.S. PATENT DOCUMENTS

2016/0117670 A1* 4/2016 Davis ..................... G06Q 20/40
                                                            705/39
2016/0292680 A1* 10/2016 Wilson, Jr. ........... G06Q 20/401
2016/0364702 A1* 12/2016 Bianchi ................ G06Q 20/102
2017/0083881 A1* 3/2017 Sardela Bianchi .. G06Q 20/102
2017/0140374 A1* 5/2017 O'Brien ............... G06Q 20/4014
2018/0130034 A1* 5/2018 Taylor ................. G06Q 20/3674
2018/0218354 A1* 8/2018 Kumar .................... G06Q 20/29

FOREIGN PATENT DOCUMENTS

CN              201974858 U          9/2011

OTHER PUBLICATIONS

Smart Contracts and their Application in Supply Chain Management by MAS Angwei Law (Year: 2010).*

* cited by examiner

*Primary Examiner* — Alexander Lagor
*Assistant Examiner* — Vu V Tran
(74) *Attorney, Agent, or Firm* — Perkins Coie LLP

(57) ABSTRACT

A method and system to securely split a digital promise that is recorded in a blockchain. A digital promise represents a promise by a promisor to pay a promisee an asset when a specified condition is satisfied. The specified condition may be fulfillment of a digital contract, also recorded in the blockchain, to which the digital promise is linked. When splitting a digital promise, a split transaction is recorded indicating a split into a first child digital promise and a second child digital promise. In each child digital promise, the promisor promises to pay a child promisee a portion of the asset when a specified child condition is satisfied. When a digital promise is split, the digital promise itself is no longer payable, but the child digital promises are payable when both the specified condition and the specified child condition for the child digital promise are satisfied.

19 Claims, 17 Drawing Sheets

Create Digital Promise

Promisor _____ 501
Promisee _____ 502
Amount _____ 503
Maturity Date _____ 504

Submit 505

Link Digital Promise to Digital Contract

Digital Contract ID: _____  601
Digital Promise ID: _____  602

603
Submit

Split Digital Promise

Digital Promise ID: _____ 701
Split Promisee: _____ 702
Split Amount: _____ 703

704
Submit

*FIG. 7*

SPLITTING DIGITAL PROMISES RECORDED IN A BLOCKCHAIN

BACKGROUND

Bank of America revolutionized the banking industry by spearheading the development of the Remington Rand UNIVAC-1 and the Electronic Recording Method of Accounting ("ERMA"), which were computer systems developed in the 1950s. ERMA's primary function was to process consumer checks, which because of volume could not practically be processed manually. According to Bank of America, ERMA was one of the world's first successful computers for business applications. Since ERMA, computers have played an indispensable role in the financial industry (e.g., accounting, banking, and investing). Indeed, the automation of its business processes helped propel Bank of America from its start in San Francisco in 1904 to be the largest wealth management corporation in the world.

As globalization of manufacturing and financing increases, the "supply chain" for manufactured products is becoming increasingly complex and distributed. For example, the supply chain for the manufacturing of computers includes mines to extract elements and compounds (e.g., rare earth metals used in central processing units), factories to generate plastics (e.g., for housing), factories to assemble components, shipping companies to transport components, energy plants to deliver energy, and so on with ultimate delivery of computers to consumers. The purchasers and suppliers of a supply chain can be located throughout the world. A difficulty with a supply chain, especially if it is worldwide, is that a purchaser or a supplier may not be able to fulfill the terms of their agreement. For example, a supplier who is provided partial payment may not deliver any goods or services (referred to as products) to the purchaser. Alternatively, if the products are delivered, the purchaser may not make the final payment. In some cases, a supplier may use the agreement as collateral to borrow money from a bank to help fund the manufacturing of the goods or the providing of the service until payment is received from the purchaser when the terms of the agreement are fulfilled. In some cases, an unscrupulous supplier may use the agreement as collateral to borrow money from multiple banks that are unaware that the supplier has borrowed from other banks. In such a case, the banks are at risk of not being paid back.

If the terms of an agreement cannot be fulfilled, one of the parties to the agreement or a third party relying on the agreement as collateral may need to resort to a court system for remedy. In some jurisdictions, however, the parties may not have an effective remedy because, for example, the court systems are not well-developed or may tend to favor locals. Because of this difficulty, parties may be hesitant to deal with parties from such jurisdictions even though the majority of the purchasers and suppliers are able to and do fulfill the terms of their agreements. It would be desirable to have a technology that would help ensure that parties can effectively deal with parties throughout the world while reducing risk in the event an agreement is breached.

As in the 1950s, revolutionary changes are currently taking place in the financial industry, with the current changes based on blockchain and distributed ledger technologies. Blockchain and distributed ledger technologies have their roots in the bitcoin system, which was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner as represented by the new owner's public key. The public and private key pair of a party is stored in a "wallet." Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions for a bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UXTO") set because it tracks the output of all transactions that have not yet been spent.

Although the bitcoin system has been very successful, it is limited to transactions in bitcoins or other cryptocurrencies. Efforts are currently underway to use blockchains to support transactions of any type, such as those relating to the sale of vehicles, sale of financial derivatives, sale of stock, payments on contracts, and so on. Such transactions use identity tokens, to uniquely identify something that can be owned or can own other things. An identity token for a physical or digital asset is generated using a cryptographic one-way hash of information that uniquely identifies the asset. Tokens also have an owner that uses an additional public/private key pair. The owner public key is set as the token owner identity, and when performing actions against tokens, ownership proof is established by providing a signature generated using the owner's private key and validated against the public key listed as the owner of the token. A person can be uniquely identified, for example, using a combination of a user name, social security number, and biometric (e.g., fingerprint). A product (e.g., refrigerator) can be uniquely identified, for example, using the name of its manufacturer and its seral number. The identity tokens for each would be a cryptographic one-way hash of such combinations. The identity token for an entity (e.g., person or company) may be the public key of a public/private key pair, where the private key is held by the entity. Identity tokens can be used to identify people, institutions, commodities, contracts, computer code, equities, derivatives, bonds, insurance, loans, documents, and so on. Identity tokens can also be used to identify collections of assets. An identity token for a collection may be a cryptographic one-way hash of the digital tokens of the assets in the collection. The creation of an identity token for an asset in a blockchain establishes provenance of the asset, and the identity token can be used in transactions (e.g., buying, selling, insuring) of the asset stored in a blockchain, creating a full audit trail of the transactions.

To record a simple transaction in a blockchain, each party and asset involved with the transaction needs an account (e.g., as a member of the blockchain system) that is identified by a digital token or in some blockchain system needs only a wallet with their private and public key pair. For example, when one person wants to transfer a car to another person, the current owner and next owner create accounts, and the current owner also creates an account that is uniquely identified by its vehicle identification number. The account for the car identifies the current owner. The current owner creates a transaction against the account for the car that indicates that the transaction is a transfer of ownership, indicates the public keys (i.e., identity tokens) of the current owner and the next owner, and indicates the identity token of the car. The transaction is signed by the private key of the current owner, and the transaction is evidence that the next owner is now the current owner.

To enable more complex transactions, some systems use "smart contracts." A smart contract is computer code that implements transactions of a contract. The computer code may be executed in a secure platform (e.g., an Ethereum platform or a Hyperledger platform) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset. The inputs to a smart contract to sell a car may be the identity tokens of the seller, the buyer, and the car, as well as the sale price in U.S. dollars. The computer code ensures that the seller is the current owner of the car and that the buyer has sufficient funds in their account. The computer code then records a transaction that transfers the ownership of the car to the buyer and a transaction that transfers the sale price from the buyer's account to the seller's account. If the seller's account is in U.S. dollars and the buyer's account is Canadian dollars, the computer code may retrieve a currency exchange rate, determine how many Canadian dollars the seller's account should be debited, and record the exchange rate. If either transaction is not successful, neither transaction is recorded.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide on which transactions to keep and which transactions to discard. Although the execution of the computer code at each node helps ensure the authenticity of the blockchain, it requires large amounts of computer resources to support such redundant execution of computer code.

The term "contract" has been used to describe the computer code of a contract under the UXTO model of bitcoin and the computer code of the "smart contracts" model of the Ethereum platform. The "contracts" under these models are, however, different. In the UXTO model, the distributed ledger is a set of immutable rows keyed by (hash: output index) values. The "hash" is a hash of the transaction that generated the output represented by the row, and the "output index" identifies which one of the possibly many outputs of the transaction that the row represents. A UXTO contract is deterministic and performs no processing other than validating the inputs to the transaction. In the "smart contract" model, the computer code of the smart contract is an instantiation of the computer code that is maintained by every node that stores the blockchain. A "smart contract" can perform virtually any type of processing such as receiving messages, sending messages, accessing external databases, and so on.

BRIEF DESCRIPTION OF THE DRAWINGS

FIG. 5 illustrates a display page that supports the creating of a digital promise by the SSDP system in some embodiments.

FIG. 6 illustrates a display page that supports the linking of a digital promise to a digital contract by the SSDP system in some embodiments.

FIG. 7 illustrates a display page that supports the splitting of a digital promise by the SSDP system in some embodiments.

DETAILED DESCRIPTION

Figure 1:
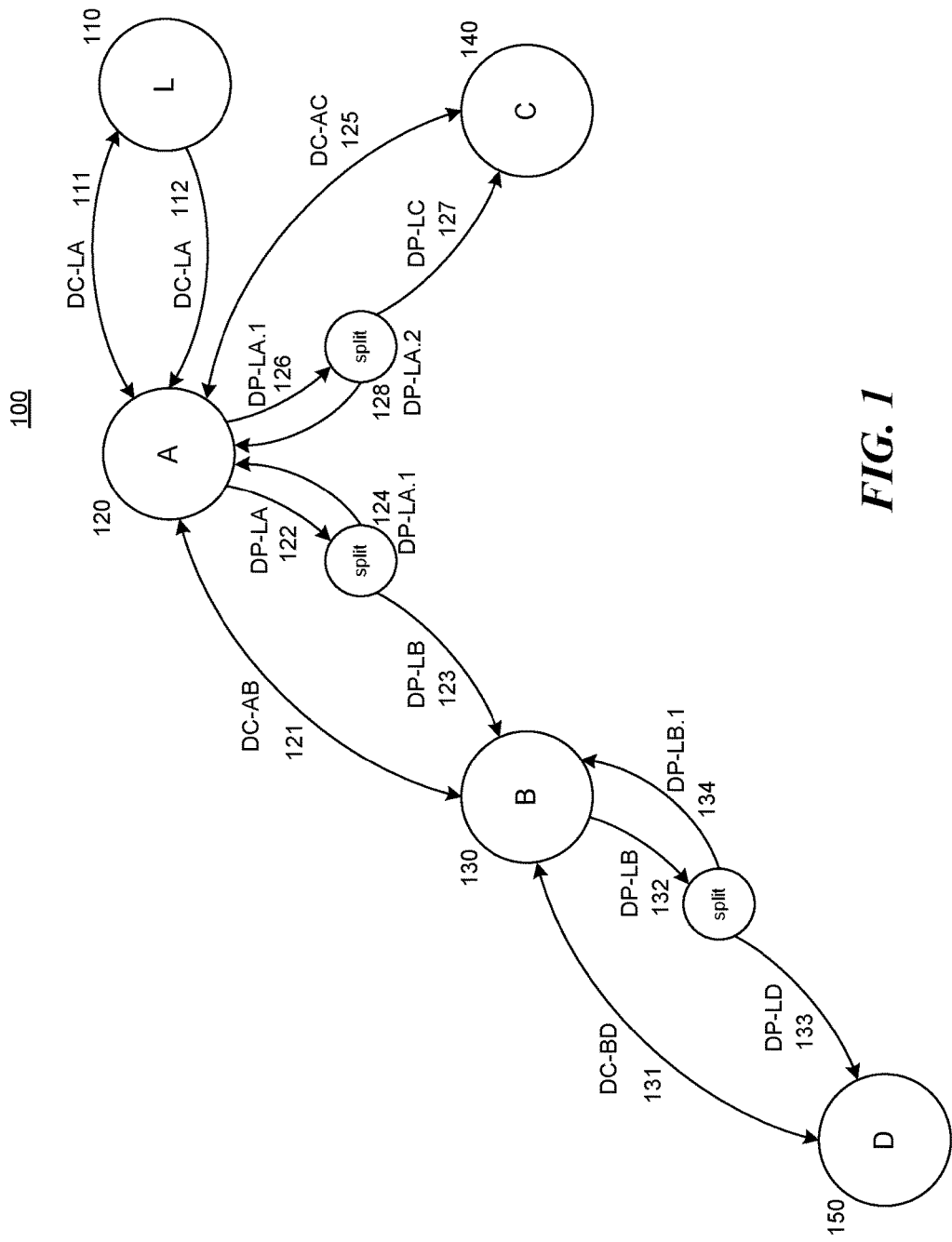
FIG. 1 is a diagram illustrating the digital agreements and transactions relating to a supply chain in some embodiments.

A method and system for a computing system to allow a digital promise to be securely split so that a promisee of the digital promise can pass a portion of the digital promise to another promisee in a secure manner. In some embodiments, a secure split digital promise ("SSDP") system is provided for securely executing transactions relating to digital promises. A digital promise represents a promise by a promisor to pay a promisee an asset when a specified condition is satisfied. For example, the promisor may be a lender, and the promisee may be a manufacturer. The asset, as used in the following, may be a certain amount of money, gold, oil, cryptocurrency (e.g., bitcoins), or other item with a monetary value. The specified condition may be the delivery of a product in compliance with the terms of a contract. For example, the contract may specify that that the manufacturer is to deliver a certain quantity of a product (e.g., cars). The terms of the contract may specify the product, the quantity, the delivery location, and the deliver-by date. If the specified quantity of the product is delivered to the delivery location by the deliver-by date, the terms of the contract have been complied with and the contract is considered to have been fulfilled. A digital promise may be linked to a contract as a promise to pay the amount of the digital promise when the terms of the contract are fulfilled. The digital promise is not payable until the terms of the contract to which it is linked are fulfilled.

In some embodiments, the SSDP system provides a technological solution to help reduce the risk of loss by a purchaser when a supplier fails to fulfill the terms of a contract. The SSDP system maintains a distributed ledger that is implemented using blockchain technology on which parties to contracts, and in particular contracts relating to a supply chain, can record digital promises and digital contracts and transactions relating to the digital promises and digital contracts. Digital promises and digital contracts are "digital" in the sense that they are digitally recorded in a distributed ledger. In the following, a typical example scenario of a supply chain that relies on digital promises and digital contracts is described, followed by a description of the supporting technology.

In the example scenario, an automobile manufacturer may employ the SSDP system to track digital promises and digital contracts of its supply chain. To manufacture a certain quantity of automobiles, the automobile manufacturer may obtain an automobile manufacturer digital promise from a bank for a certain amount of money, for example, $10M. The automobile manufacturer digital promise may be linked to a digital contract between the bank and the automobile manufacturer that specifies that a certain number of automobiles are to be manufactured and delivered to a shipping location by a certain date. The SSDP system records both the automobile manufacturer digital promise and the automobile manufacturer digital contract along with a link transaction linking the automobile manufacturer digital promise to the automobile manufacturer digital contract in the distributed ledger provided by the SSDP system. To purchase tires from a tire supplier, the automobile manufacturer may rely on the automobile manufacturer digital promise in paying the tire supplier. The automobile manufacturer may request the SSDP system to record a split transaction to split the automobile manufacturer digital promise into a tire supplier digital promise, in which the bank will pay the tire supplier a certain portion of the $10M such as $100K, and a retained automobile manufacturer digital promise of $9.9M. The automobile manufacturer and the tire supplier use the SSDP system to record their tire supplier digital contract in the distributed ledger. A link transaction linking the tire supplier digital promise to the tire supplier digital contract and a link transaction linking the retained automobile manufacturer digital promise to the automobile manufacturer digital contract are recorded in the distributed ledger.

Continuing with the example, the splitting of the automobile manufacturer digital promise and the linking of a tire supplier digital promise to the tire supplier digital contract and the linking of the retained automobile manufacturer digital promise to the automobile manufacturer digital contract means that the bank promises to pay $100K to the tire supplier and $9.9M to the automobile manufacturer when the conditions of the digital promises are satisfied. When the automobile manufacturer digital contract is fulfilled, then the condition of the retained automobile manufacturer digital promise is fulfilled and the bank is obligated to pay $9.9M to the automobile manufacturer when the retained automobile manufacturer digital promise is fulfilled. When both the automobile manufacturer digital contract and the tire supplier digital contract are fulfilled, then the condition of the tire supplier digital promise is fulfilled and the bank is obligated to pay $100K to the tire supplier. If the automobile manufacturer digital contract is not fulfilled, even though the tire supplier digital contract is fulfilled, the bank is not obligated to pay on the tire supplier digital promise.

Because digital promises, digital contracts, split transactions, and link transactions are recorded in the distributed ledger, the distributed ledger contains an irrefutable proof of the current state of the contracts of the supply chain. For example, by reviewing the distributed ledger, the tire supplier can be assured that the $100K has not been and cannot be promised to another party and that the bank is standing behind the tire supplier digital promise. Also, by reviewing the distributed ledger, the bank can be assured that the conditions of the digital promises are satisfied before paying on the digital promises.

In some embodiments, the SSDP system records digital agreement code for each digital agreement in the distributed ledger. A digital promise and a digital contract are digital agreements. Digital agreement code is a computer program that may be implemented as a smart contract (e.g., of the Ethereum platform) or chain code (e.g., of the Hyperledger platform). The digital agreement code enforces the terms of a digital agreement. The SSDP system may provide digital promise code and digital contract code for various types of digital promises and digital contracts. For example, one digital contract may be for the delivery of goods on a certain delivery date, and another digital contract may be for ongoing delivery of goods at certain intervals. As another example, one digital promise may have a maturity date, and another digital promise may not have a maturity date. The SSDP system may provide a user interface through which parties to a digital agreement can select the appropriate type of digital agreement to meet their needs. The user interface allows the parties to specify the variable terms of the digital agreement, such as the amount of the digital promise, persons authorized to access and apply transactions to the digital agreement, the product and quantity being purchased by a digital contract, the delivery location and delivery date of a digital contract, the prices of a digital contract, and so on. In some embodiments, the ledger in which the transaction are stored need not be "distributed." In such a case, an organization may maintain a node with a single blockchain of the transactions. If the organization is trusted by the parties to the digital agreements, then that single blockchain may be considered irrefutable proof of the transactions between the parties. The term "ledger" refers to a record of transactions stored in a blockchain.

In some embodiments, once parties have agreed on the terms of a digital agreement, the parties may use the SSDP system to sign and record the signed digital agreement in the distributed ledger. To sign a digital agreement, the SSDP system generates a hash of the digital agreement code (which includes the terms of the digital agreement) and a party encrypts the hash with its private key. When the SSDP system receives the signed hash from each party, it uses the parties public key to verify the signatures. If the signatures of the parties are verified, the SSDP system records the signed digital agreement in the distributed ledger.

In some embodiments, after an original promisor and an original promisee (i.e., the parties) agree to an original digital promise, the SSDP system records a create digital promise transaction that includes the signed digital promise code of the original digital promise. The original digital promise may then be linked to an original digital contract whose fulfillment is the payment condition of the original digital promise. The original digital promise may be linked to the original digital contract when the original digital contract is initially recorded, may be linked as a step in the splitting of a digital promise or may be linked by a link transaction on the already recorded original digital contract. When the original promisee wants to use a portion of the original digital promise for payment of another digital contract (e.g., downstream on the supply chain), the original promisee submits to the SSDP system a split transaction to split the original digital promise into a first child digital promise and a second child digital promise. The first child digital promise is a promise to pay a first portion of the asset of the original digital promise to a first child promise, and the second child digital promise is a promise to pay the remainder of the asset (i.e., the asset minus the first portion) to a second child promisee (e.g., the original promisee). For example, the original promisor may be a lender, the original promisee may be a manufacturer, and the first child promisee may be a supplier who supplies product to the manufacturer. When processing the submitted split transaction, the SSDP system may send a split transaction message to each instance of the blockchain in the distributed ledger. When the message is received, the blockchain system invokes split transaction code of the digital promise code of the original digital promise. The split transaction code verifies that the original promisee is authorized to split the original digital promise and if authorized, records the split transaction in the distributed ledger. The split transaction code may also record a first child digital promise transaction and a second child digital promise transaction that reference the original digital promise. Because child digital promises can be further split, the digital promises may be represented as a binary tree of digital promises with a parent-child relationship. Also, each ancestor digital promise may be considered to be an upstream digital promise in the sense that it is upstream in the supply chain, and each descendent digital promise may be considered to be a downstream digital promise in the sense that it is downstream in the supply chain The original promisee and the first child promisee, after agreeing to terms of a supplier digital contract, record a create digital contract transaction with the original promisee as the purchaser and the first child promisee as the supplier. They create a digital contract transaction that contains the terms and the digital contract code implementing transactions that can be performed on the supplier digital contract. The purchaser may then submit a link transaction to the digital contract code of the supplier digital contract to link the first child digital promise to the supplier digital contract. The digital contract code may obtain the signatures of both the purchaser and the supplier on the link transaction indicating their approval before recording the link transaction. When the supplier fulfills the terms of the supplier digital contract, the supplier submits to the digital contract code for the supplier digital contract a fulfilled transaction to indicate that terms of the supplier digital contract have been satisfied. After obtaining the signatures of the purchaser and the supplier on the fulfilled transaction, the digital contract code records the signed fulfilled transaction to indicate that the terms of the digital contract have been fulfilled and that the condition of the first child digital promise is satisfied. When the condition of the original digital promise is also satisfied, the first child promisee can submit a payment request on the first child digital promise to the original promisor. The SSDP system may invoke the digital promise code of the original digital promise and the first child digital promise to ensure that all the conditions have been satisfied and then direct that payment can be made to the first child promisee.

FIG. 1 is a diagram illustrating the digital agreements and transactions relating to a supply chain in some embodiments. A process diagram 100 illustrates parties L 110, A 120, B 130, C 140, and D 150. L (e.g., a lender such as a bank) and A (e.g., a manufacturer) may initially agree to and record 111 a digital contract, referred to as DC-LA. L may also record 112 a digital promise to pay A, referred to as DP-LA. In DP-LA, L promises to pay A an asset (e.g., a sum of money) when DC-LA is fulfilled. L may then submit (not illustrated) a link transaction to digital contract code of DC-LA to link DP-LA to DC-LA. A and B (e.g., a supplier) may agree to and record 121 a digital contract, referred to as DC-AB. A may also submit 122 a split transaction to the digital promise code of DP-LA. In response, the digital promise code splits 123 and 124 DP-LA into a digital promise, referred to as DP-LB, to pay a portion of the asset of DP-LA to B and into a digital promise, referred to as DP-LA.1, to pay the remainder of the asset to A. A may then submit (not illustrated) a link transaction to the digital contract code of DC-AB to link DP-LB to DC-AB and submit a link transaction to the digital contract code of DC-LA to link DP-LA.1 to DC-LA.

A and C (e.g., another supplier) may agree to and record 125 a digital contract, referred to as DC-AC. A may also submit 126 a split transaction to the digital promise code of DP-LA.1. In response, the digital promise code splits 127 and 128 DP-LA.1 into a digital promise, referred to as DP-LC, to pay a portion of the asset of DP-LA.1 to C and into a digital promise, referred to as DP-LA.2, to pay the remainder of the asset of DP-LA.1 to A. A may then submit (not illustrated) a link transaction to the digital contract code of DC-AC to link DP-LC to DC-AC and submit a link transaction to the digital contract code of DC-LA to link DP-LA.2 to DC-LA.

B and D (e.g., another supplier) may agree to and record 131 a digital contract, referred to as DC-BD. B may also submit 132 a split transaction to the digital promise code of DP-LB. In response, the digital promise code splits 133 and 134 DP-LB into a digital promise, referred to as DP-LD, to pay a portion of the asset of DP-LB to D and into a digital promise, referred to as DP-LB.1, to pay the remainder of the asset of DP-LB to B. B may then submit (not illustrated) a link transaction to the digital contract code of DC-BD to link DP-LD to DC-BD and submit a link transaction to the digital contract code of DC-LB to link DP-LB.1 to DC-LB.

Assuming that all the contracts have been recorded as fulfilled, A can tender DP-LA.2 to L for payment, B can tender DP-LB.1 to L for payment, C can tender DP-LCL for payment, and D can tender DP-LD to L for payment, and L is obligated on all the digital promises according to the terms of DP-LA. L is obligated pay on a digital promise when its condition is satisfied and when the condition of every upstream digital promise is also satisfied. For example, the upstream digital promises of DP-LD are DP-LB and DP-LA. If the condition of either DP-LB or DP-LA is not satisfied, then L will not pay on DP-LD. As another example, the upstream digital promises of DP-LC are DP-LA.1 and DP-LA. In some embodiments, L is obligated to pay on a digital promise when the conditions of the digital promise and its upstream digital promises are satisfied, even though the condition of a downstream digital promise is not satisfied. For example, L is obligated to pay on DP-LB when the conditions of DP-LB and DP-LA are satisfied even though the condition of DP-LD is not satisfied.

Figure 2:
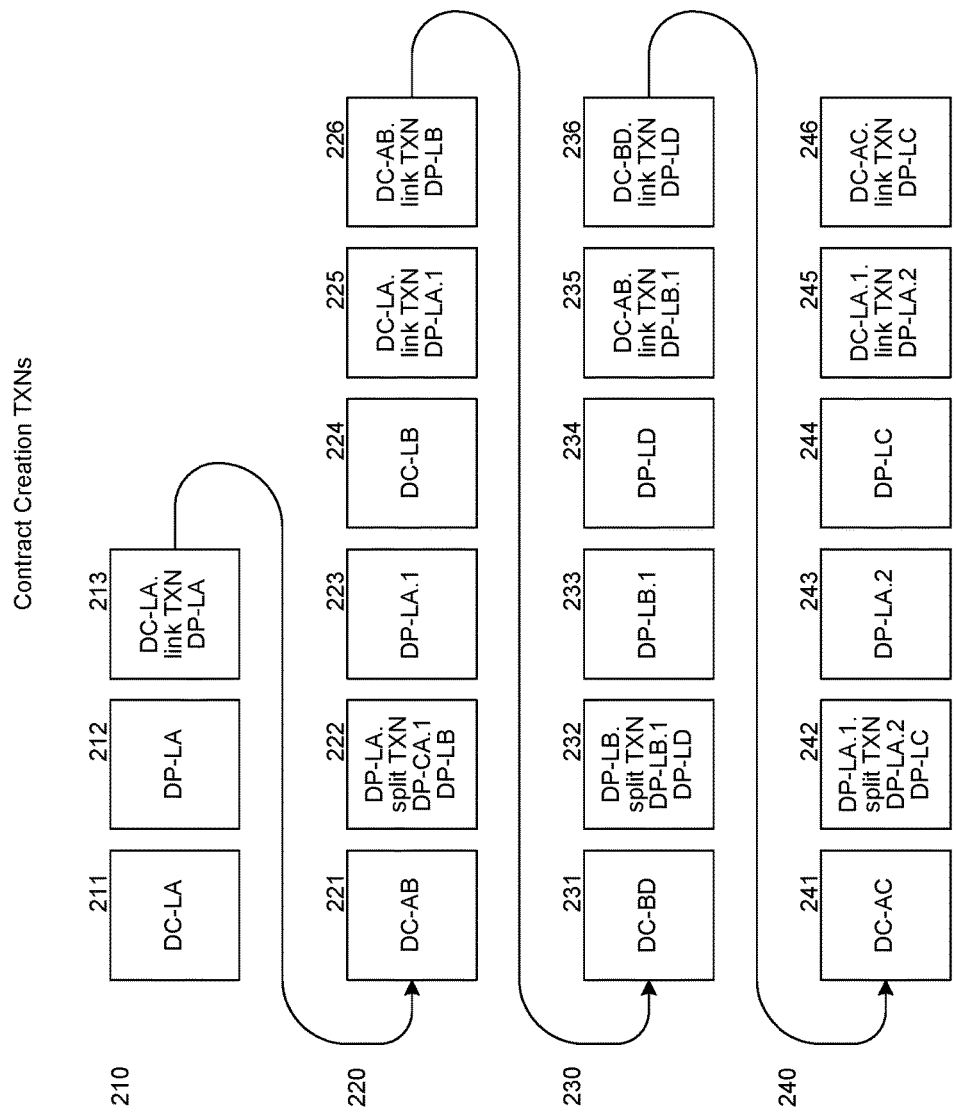
FIG. 2 is a diagram that illustrates transactions relating to the creation of the contracts of FIG. 1 that are recorded in a distributed ledger in some embodiments.

FIG. 2 is a diagram that illustrates transactions relating to the creation of the contracts of FIG. 1 that are recorded in a distributed ledger in some embodiments. Transactions 210 relate to DC-LA and DP-LA. When L and A agree on the terms of DC-LA, the SSDP system records 211 a create digital contract transaction that includes the digital contract code for DC-LA in the distributed ledger. Similarly, when L and A agree on the terms of DP-LA, the SSDP system records 212 a create digital promise transaction that includes the digital promise code for DP-LA in the distributed ledger. When an authorized party (e.g., L or A) requests to link DP-LA to DC-LA, the SSDP system invokes link transaction code of the digital contract code for DC-LA. The link transaction code records 213 a link transaction to link DP-LA to DC-LA. Alternatively, the create digital promise transaction may be recorded before the create digital contract transaction. In such a case, the create digital contract transaction may also specify that DP-LA is linked to DC-LA. The transaction code of a digital contract or a digital promise ensures that any required conditions for recording the transaction have been satisfied. For example, fulfilled transaction code for a digital contract may ensure that delivery transactions have been recorded showing delivery of all the purchased product. The transaction code also ensures that parties who are required to sign a transaction have done so. For example, a link transaction code for a digital contract may ensure that both the promisee of the digital promise to be linked and the parties to the digital contract have signed the link transaction.

Transactions 220 relate to DC-AB and the splitting of DP-LA. When A and B agree on the terms of DC-AB, the SSDP system records 221 a create digital contract transaction that includes the digital contract code for DC-AB in the distributed ledger. When an authorized party (e.g., A) requests to split DP-LA, the SSDP system invokes split transaction code of the digital promise code for DP-LA. The split transaction code records 222 a split transaction to split DP-LA into DP-LB and DP-LA.1 and may record 223 and 224 create digital promise transactions for DP-LB and DP-LA.1. Each create digital promise transaction includes the terms of the digital promise and may include digital promise code, such as a replica, of the digital promise code for DP-LA. Alternatively, the create digital promise transaction may include a reference to the digital promise code for DP-LA, which is executed to perform transactions for DP-LB and DP-LA.1. When an authorized party (e.g., A) requests to link DP-LB to DC-AB and to link DP-LA.1 to DC-LA, the SSDP system invokes link transaction code of the digital contract code for DC-AB and DC-LA. The link transaction code records 225 and 226 a link transaction to link DP-LA.1 to DC-LA and a link transaction to link DP-LB to DC-AB.

Transactions 230 relate to DC-BD and the splitting of DP-LB. When B and D agree on the terms of DC-BD, the SSDP system records 231 a create digital contract transaction that includes the digital contract code for DC-BD in the distributed ledger. When an authorized party (e.g., B) requests to split DP-LB, the SSDP system invokes split transaction code of the digital promise code for DP-LB. The split transaction code records 232 a split transaction to split DP-LB into DP-LD and DP-LB.1 and may record 233 and 234 create digital promise transactions for DP-LD and DP-LB.1. When an authorized party (e.g., B) requests to link DP-LD to DC-BD and to link DP-LB.1 to DC-AB, the SSDP system invokes link transaction code of the digital contract code for DC-BD and DC-AB. The link transaction code records 235 and 236 a link transaction to link DP-LB.1 to DC-AB and a link transaction to link DP-LD to DC-BD.

Transactions 240 relate to DC-AC and the splitting of DP-LA.1. When A and C agree on the terms of DC-AC, the SSDP system records 241 a create digital contract transaction that includes the digital contract code for DC-AC in the distributed ledger. When an authorized party (e.g., A) requests to split DP-LA.1, the SSDP system invokes split transaction code of the digital promise code for DP-LA.1. The split transaction code records 242 a split transaction to split DP-LA.1 into DP-LC and DP-LA.2 and may record 243 and 244 create digital promise transactions for DP-LC and DP-LA.2. When an authorized party (e.g., A) requests to link DP-LC to DC-AC and to link DP-LA.2 to DC-LA, the SSDP system invokes link transaction code of the digital contract code for DC-AC and DC-LA. The link transaction code records 245 and 246 a link transaction to link DP-LA.2 to DC-LA and a link transaction to link DP-LC to DC-AC.

Figure 3:
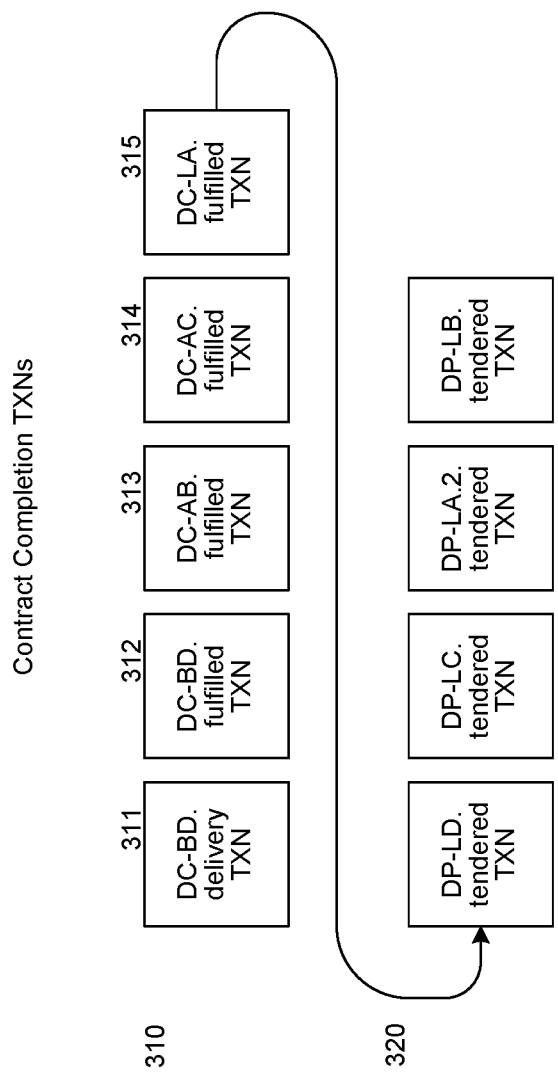
FIG. 3 is a diagram that illustrates transactions relating to completion of contracts of FIG. 1 that are recorded in a distributed ledger in some embodiments.

FIG. 3 is a diagram that illustrates transactions relating to completion of contracts of FIG. 1 that are recorded in a distributed ledger in some embodiments. Transactions 310 relate to fulfilled transactions for the digital contracts. The digital contract code for DC-BD may support delivery transactions, for example, to record each partial delivery of products for DC-BD. When an authorized party (e.g., B) requests to record a delivery transaction for DC-BD, the SSDP system invokes delivery transaction code of the digital contract code for DC-BD. The delivery transaction code records 311 a delivery transaction for DC-BD. Although only one delivery transaction is shown as recorded, multiple delivery transactions may be recorded for each partial delivery when DC-BD allows for such multiple deliveries. When the terms of DC-BD, DC-AB, DC-AC, or DC-LA are fulfilled, an authorized party requests to record a fulfilled transaction for the digital contract. When requested, the SSDP system invokes fulfilled transaction code for the digital contract. The fulfilled transaction code for each digital contract ensures that the conditions for the fulfilled transaction are satisfied and records 312-315 the fulfilled transactions.

Transactions 320 relate to tendered transactions for the digital promises. When a promisee of a digital promise requests a tendered transaction for payment, the SSDP system invokes tendered transaction code for the corresponding digital promise. The tendered transaction code ensures that conditions of the linked digital promise are satisfied. The tendered transaction code may notify the lender for the digital promise requesting evidence of payment, such as a recorded transfer transaction in which a third party attests that payment on the digital promise has been transferred from the lender to the promisee. The digital promise code may also have code for the transfer transaction. When the evidence is provided, the tendered transaction code may record a tendered transaction on the digital promise indicating that the payment has been tendered and paid.

Figure 4:
FIG. 4 illustrates a display page to support the creating of a digital contract by the SSDP system in some embodiments.

FIG. 4 illustrates a display page to support the creating of a digital contract by the SSDP system in some embodiments. A display page 400 includes a contract type drop-down list 401, a purchaser field 402, a supplier field 403, a product specification field 404, a quantity field 405, a cost field 406, a delivery date field 407, and a create button 408. A party (i.e., purchaser or supplier) to the contract uses the display page to select the contract type and specify the terms of the contract. The party selects the type of contract from the contract type drop-down list. For example, the contract types may include a digital contract for delivery of a product by a certain date, a digital contract for recurring delivery of a product, a digital contract for providing services, and so on. The SSDP system provides digital contract code for each digital contract. In addition, the SSDP system may allow the parties to provide custom digital contract code for a digital contract. By using custom digital contract code, the digital contracts can be of arbitrary complexity. For example, a digital contract may have more than two parties, may have unconventional terms, and so on. When the party selects the contract type, the SSDP system may display fields that are appropriate to that contract type. After the party provides the information for the terms of the contract via fields 402-407, the party selects the create button to create the digital contract. To create the digital contract, the SSDP system requests the parties to sign the digital contract using their private keys. After the SSDP system verifies the signatures of the parties using the public keys of the parties, the SSDP system records the digital contract in the distributed ledger. The display page may have additional fields or may omit some of the fields depending on the type of the digital contract. For example, the party may specify who is authorized to perform each type of transaction and whose signatures are required on the transactions.

FIG. 5 illustrates a display page that supports the creating of a digital promise by the SSDP system in some embodiments. A display page 500 includes a promisor field 501, a promisee field 502, an amount field 503, a maturity date field 504, and a submit button 505. The promisor (e.g., lender) enter the terms of the digital promise. Although not illustrated, the display page may allow the promisor to enter other information such as the identity of a digital contract to which the digital promise is to be linked, required conditions for the various transactions, authorized parties, and so on. For example, the promisor may indicate that only the promisee can initiate a split transaction, that either the promisor or the promisee can initiate a link transaction, and so on. After the promisor provides the information for the terms of the digital promise via fields 501-504, the promisor selects the create button to create the digital promise. To create the digital promise, the SSDP system requests the parties to the digital promise to sign the digital promise using their private keys. After the SSDP system verifies the signatures of the parties using the public keys of the parties, the SSDP system records the digital promise (e.g., digital promise code and the terms) in the distributed ledger.

FIG. 6 illustrates a display page that supports the linking of a digital promise to a digital contract by the SSDP system in some embodiments. A display page 600 includes a digital contract identifier field 601, a digital promise identifier field 602, and a submit button 603. The SSDP system may maintain a mapping of members to the digital contracts and digital promises to which the members are parties. The identifier fields may be implemented as a drop-down list for selecting the digital promise and digital contract. After a party to the digital contract selects the digital promise and the digital contract, the party selects the submit button to link the digital promise to the digital promise. To link the digital promise to the digital contract, the SSDP system sends a link transaction message to the digital contract code. The link transaction code of the digital contract requests the parties to the digital contract and the promisee of the digital promise (who is likely the supplier of the digital contract) to sign the link transaction using their private keys. After the SSDP system verifies the signatures of the parties and the promisee, the SSDP system records the link transaction in the distributed ledger.

FIG. 7 illustrates a display page that supports the splitting of a digital promise by the SSDP system in some embodiments. A display page 700 includes an original digital promise identifier field 701, a split promisee field 702, a split amount field 703, and a submit button 704. The original digital promise identifier field may be a drop-down list that lists the digital promises for which the requesting party is the promisee. The requesting party selects an original digital promise and enters the split promisee for the split digital promise and a split amount. The SSDP system ensures that the split amount is not greater than the original amount of the original digital promise. After the party selects the submit button, the SSDP system creates a split transaction that indicates that the original digital promise is being split. The SSDP system also creates a first split digital promise for the split amount with the original promisor of the original digital promise as the promisor and with the split promisee as the promisee. If the split amount is less than the amount of the original digital promise, the SSDP system creates a second split digital promise with the same original promisor and original promisee as the original digital promise and with an amount (i.e., retained amount) that is the difference between the original amount and the split amount. The SSDP system may then request the original promisee to sign a split transaction and the second split digital promise and both the original promisee and the split promisee to sign the first split digital promise. After verifying the signatures, the SSDP system records the split transaction and the first split digital promise and the second digital promise in the distributed ledger. In some embodiments, the SSDP system may not separately record a separate split transaction, but rather may record only the first split digital promise and the second split digital promise, which each contain a reference to the original digital promise. Also, the SSDP system may allow the second digital promise to have a promisee that is different from the original promisee of the original digital promise. Although not illustrated in FIGS. 4-7, the SSDP system may allow a requesting party to specify various access rights to the digital contracts and the digital promises that supersede any default access rights. For example, the default access rights for a digital contract may be that the parties to the digital contract can view the digital contract and record transactions for the digital contract and that the promisor of a linked digital promise can view the digital contract. When a digital contract is created, the parties can specify that an additional party can view the digital contract, for example, for auditing purposes.

Figure 8:
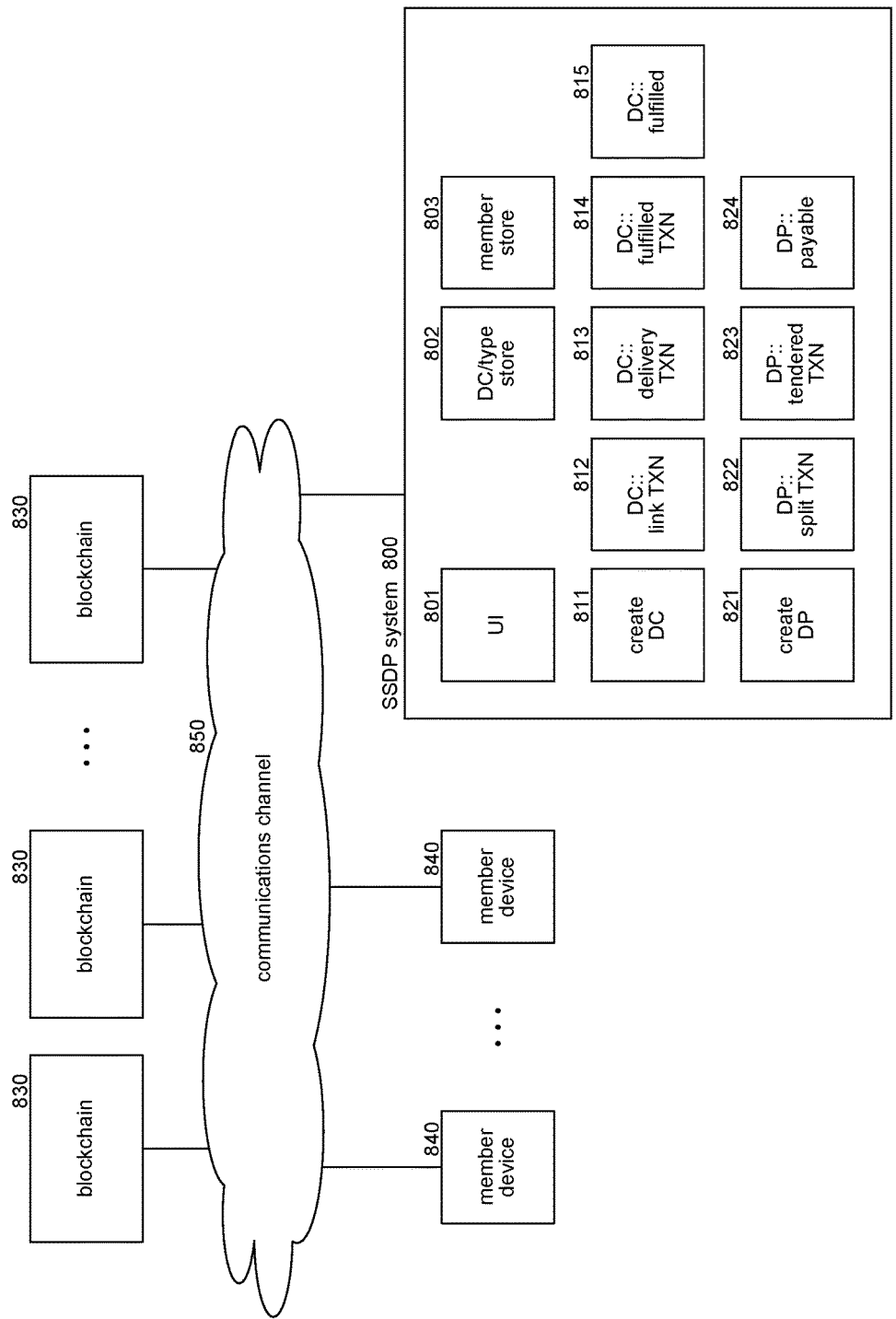
FIG. 8 is a block diagram illustrating components of the SSDP system in some embodiments.

FIG. 8 is a block diagram illustrating components of the SSDP system in some embodiments. An SSDP system 800 communicates with blockchain devices 830 and member devices 840 via a communications channel 850. The member devices are computing devices that may have a client-side component of the SSDP system that is developed to provide the user interface of the SSDP system. Alternatively, the member devices may use a web browser to access the SSDP system. Each blockchain device may store an instance of a blockchain in which each of the transactions of the SSDP system are recorded. The distributed ledger comprises the instances of the blockchains. Each blockchain device may also have a blockchain system that receives transaction requests, each of which specifies a digital agreement and invokes transaction code of the specified digital agreement. The blockchain system may also receive requests to record transactions such as transactions to create digital agreements. The communications channel may be the Internet.

The SSDP system includes a user interface component 801, a digital contract type store 802, and a member store 803. The user interface component provides the user interface through which members using member devices access the SSDP system. The digital contract type store stores the digital contract code for the various types of digital contracts. The member store contains an entry for each member or user that is allowed to use the SSDP system. Each entry includes information such as the name of the member, the organization the member is affiliated with, if any, the public key of the member, and so on. The user interface component may be responsible for authenticating members during a logon process. For example, the SSDP system may employ a multifactor authentication technique such as requiring entry of a user name, password, and one-time code sent to the member via a text message.

The SSDP system also includes digital contract components such as a create digital contract component 811, a link transaction component 812, a delivery transaction component 813, a fulfilled transaction component 814, and a fulfilled component 815. The create digital contract component may be invoked when a submit button on a create digital contract display page is selected. The create digital contract component coordinates the creating of a create digital contract transaction that includes the terms of the digital contract and the digital contract code, such as the code of components 812-815. The create digital contract component then records the create digital contract transaction in the distributed ledger by sending an indication of the create digital contract transaction to each blockchain device. If the digital contracts are considered to be objects (in an object-oriented sense) that are instantiated in the distributed ledger, then the components 812-815 may be considered member functions or methods of the objects. The link transaction component of a digital contract links a specified digital promise to the digital contract. The delivery transaction component of a digital contract records a delivery transaction for the digital contract. The fulfilled transaction component of a digital contract records a fulfilled transaction for the digital contract. The fulfilled component of a digital contract is invoked to determine whether the terms of the digital contract have been fulfilled.

The SSDP system also includes digital promise components that include a create digital promise component 821, a split transaction component 822, a tendered transaction component 823, and a payable component 824. The create digital promise component is invoked to create a digital promise and record the digital promise as a digital promise transaction. If the digital promises are considered to be objects (in an object-oriented sense) that are instantiated in the distributed ledger, then the components 822-824 may be considered member functions or methods of the objects. The split transaction component of a digital promise records a split transaction for the digital promise. The tendered transaction component for a digital promise records a tendered transaction for the digital promise. The payable component for a digital promise is invoked to determine whether the conditions of the digital promise have been satisfied and the digital promise can be paid.

The computing systems (e.g., clients, servers, client devices, and server devices) on which the SSDP system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the SSDP system. The data transmission media are used for transmitting data via transitory, propagating signals or carrier waves (e.g., electromagnetism) via a wired or wireless connection.

The SSDP system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the SSDP system may be implemented in hardware using, for example, an application-specific integrated circuit (ASIC).

Figure 9:
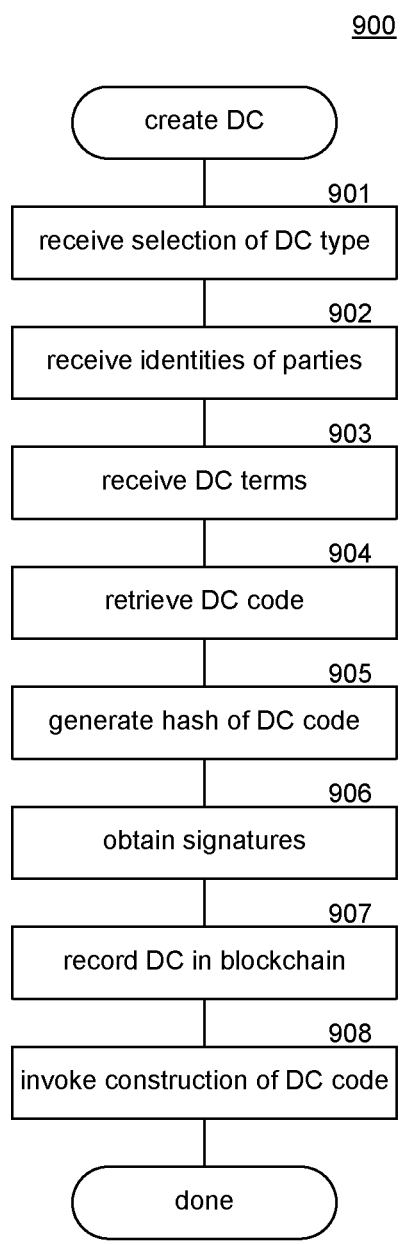
FIG. 9 is a flow diagram that illustrates the processing of a create digital contract component in some embodiments.

FIG. 9 is a flow diagram that illustrates the processing of a create digital contract component in some embodiments. A create digital contract component 900 is invoked to coordinate the input of the terms of the digital contract and record the digital contract. In block 901, the component receives a selection of a digital contract type. In block 902, the component receives the identities of the parties to the digital contract. In block 903, the component receives the terms of the digital contract. The data received in blocks 901-903 may have been input via the display page of FIG. 4. In block 904, the component retrieves the digital contract code and adds the terms to the digital contract code. In block 905, the component may generate a hash of the digital contract code. In block 906, the component obtains the signatures of the identified parties and verifies the signatures. A signature may be an encryption of the generated hash with the private key of a party. In block 907, the component records the digital contract (e.g., the digital contract code) in the blockchain as a create digital contract transaction. In block 908, the component may invoke a constructor of the digital contract code to initialize execution of the digital contract code. The component then completes. The digital contract code may include code that implements components 812-815. When a transaction is to be recorded for a digital contract, the corresponding digital contract code may be executed at each instance of the blockchain.

Figure 10:
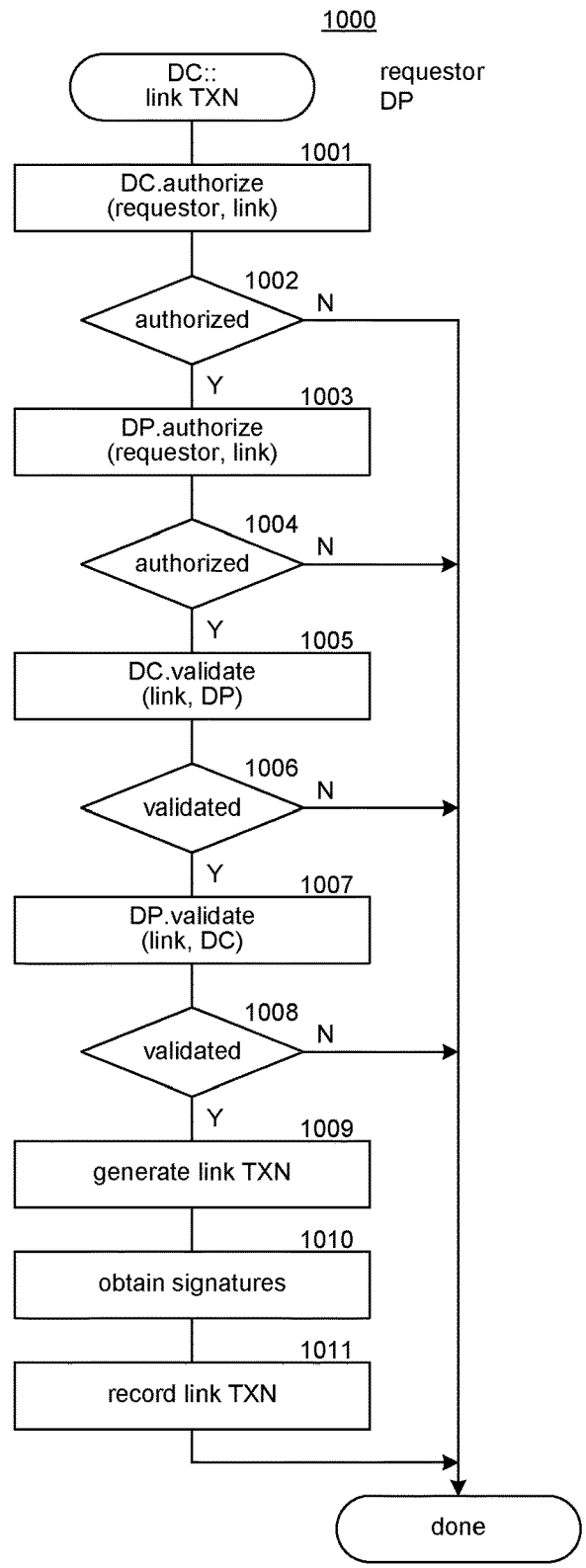
FIG. 10 is a flow diagram that illustrates the processing of a link transaction component of a digital contract in some embodiments.

FIG. 10 is a flow diagram that illustrates the processing of a link transaction component of a digital contract in some embodiments. A link transaction component 1000 may be passed an indication of a requesting party and a digital promise and record a link transaction that links the digital promise to the digital contract. In block 1001, the component invokes an authorize component of the digital contract to determine whether the requesting party is authorized to perform a link transaction on the digital contract. In decision block 1002, if authorized, then the component continues at block 1003, else the component completes. In block 1003, the component invokes an authorize component of the digital promise to determine whether the requesting party is authorized to perform a link transaction with the digital promise. In decision block 1004, if authorized, then the component continues at block 1005, else the component completes. In block 1005, the component invokes a validate component of the digital contract to validate whether the digital promise can be linked to the digital contract according to the terms of the digital contract. In decision block 1006, if validated, then the component continues at block 1007, else the component completes. In block 1007, the component invokes a validate component of the digital promise to validate whether the digital promise can be linked to the digital contract according to the terms of the digital promise. In decision block 1008, if validated, the component continues at block 1009, else the component completes. In block 1009, the component generates a link transaction. In block 1010, the component obtains the required signatures. In block 1011, the component records the link transaction in the distributed ledger and then completes.

Figure 11:
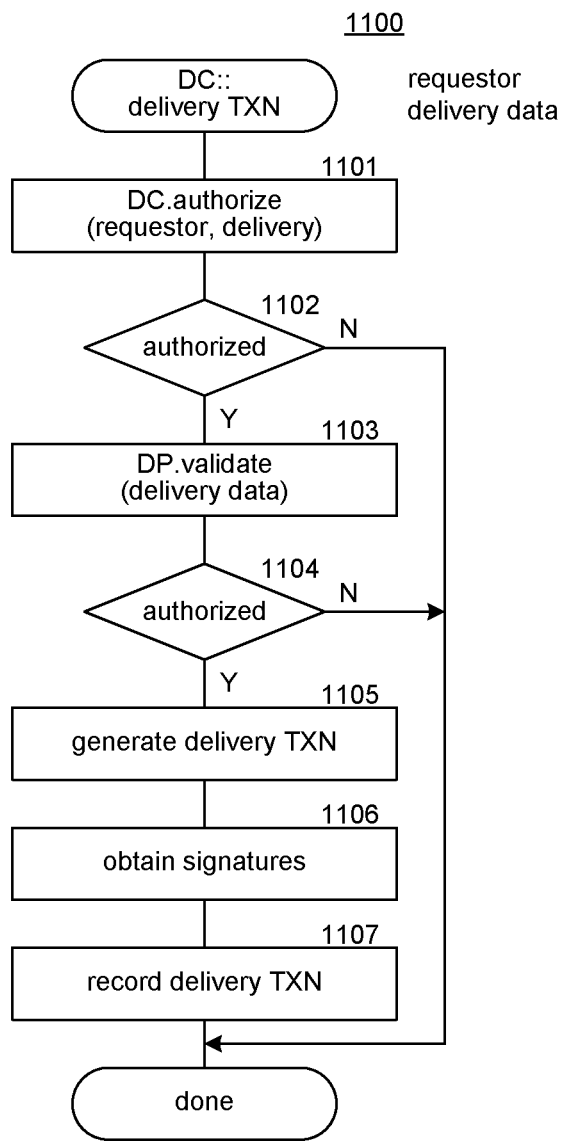
FIG. 11 is a flow diagram that illustrates the processing of a delivery transaction component of a digital contract in some embodiments.

FIG. 11 is a flow diagram that illustrates the processing of a delivery transaction component of a digital contract in some embodiments. A delivery transaction component 1100 is passed an indication of the requesting party and data pertaining to the delivery. The data pertaining to the delivery may include various documents such as shipping documents, bills of lading, and so on as evidence of delivery. The data may be recorded as part of the delivery transaction or may be recorded as a separate transaction. In block 1101, the component invokes an authorize component of the digital contract to determine whether the requesting party is authorized to perform a delivery transaction on the digital contract. In decision block 1102, if authorized, the component continues at block 1103, else the component completes. In block 1103, the component invokes a validate component of the digital contract to validate the data for a delivery transaction. As part of the validation, the component may notify the parties to the digital contract to determine whether the data complies with the requirements for a delivery transaction. In decision block 1104, if validated, the component continues at block 1105, else the component completes. In block 1105, the component generates a delivery transaction. In block 1106, the component obtains the signatures of the parties on the delivery transaction. In block 1107, if the signatures have been verified, then the component records a delivery transaction and then completes.

Figure 12:
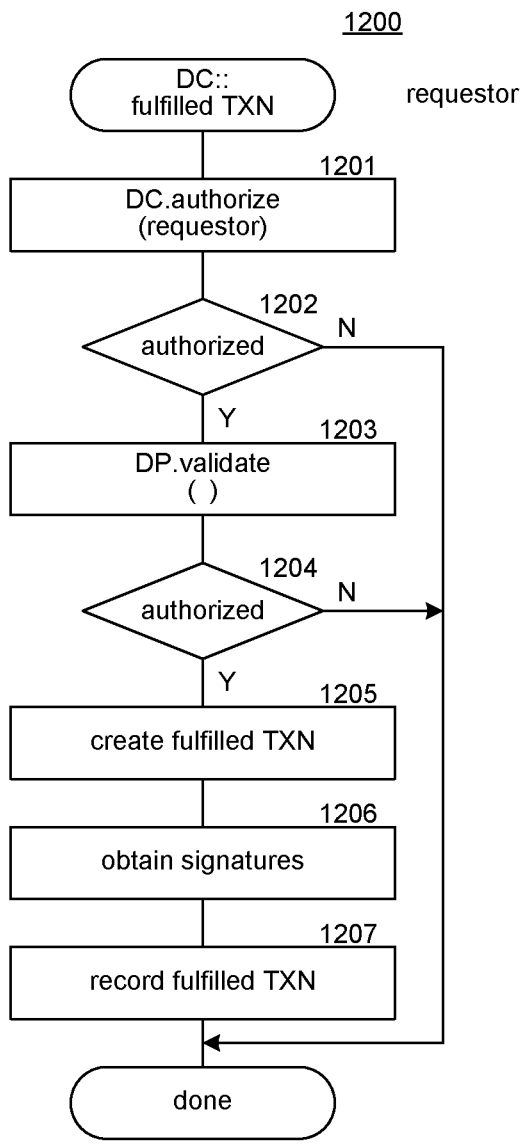
FIG. 12 is a flow diagram that illustrates processing of a fulfilled transaction component of a digital contract in some embodiments.

FIG. 12 is a flow diagram that illustrates processing of a fulfilled transaction component of a digital contract in some embodiments. A fulfilled transaction component 1200 is invoked to record a fulfilled transaction on behalf of a requesting party. In block 1201, the component invokes an authorize component of the digital contract to determine whether the requesting party is authorized. In decision block 1202, if authorized, the component continues at block 1203, else the component completes. In block 1203, the component invokes a validate component to validate whether the terms of the digital contract have been fulfilled. In decision block 1204, if validated, then the component continues at block 1205, else the component completes. In block 1205, the component creates a fulfilled transaction. In block 1206, the component obtains the signatures of the parties to the digital contract on the fulfilled transaction. In block 1207, if the signatures are verified, the component records the fulfilled transaction and then completes.

Figure 13:
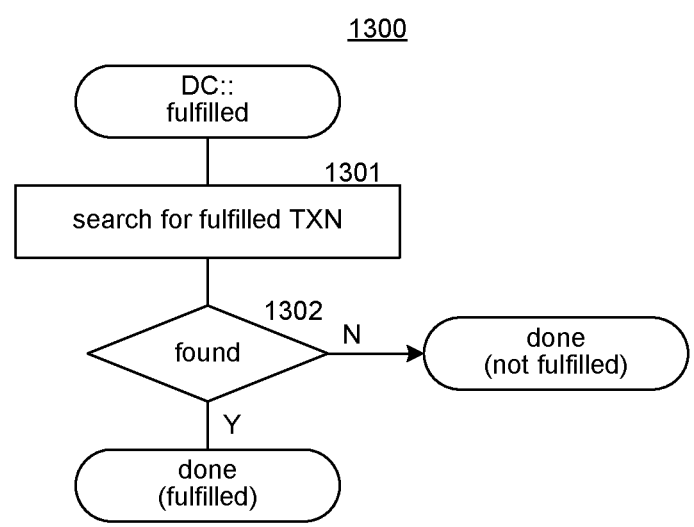
FIG. 13 is a flow diagram that illustrates processing of a fulfilled component of a digital contract in some embodiments.

FIG. 13 is a flow diagram that illustrates processing of a fulfilled component of a digital contract in some embodiments. A fulfilled component 1300 is invoked to determine whether the digital contract has been fulfilled. The component is invoked when determining whether to pay a linked digital promise or a downstream digital promise. In block 1301, the components searches the distributed ledger for a fulfilled transaction for the digital contract. In decision block 1302, if found, the component returns an indication that the digital contract has been fulfilled, else the component returns an indication that the digital contract is not fulfilled.

Figure 14:
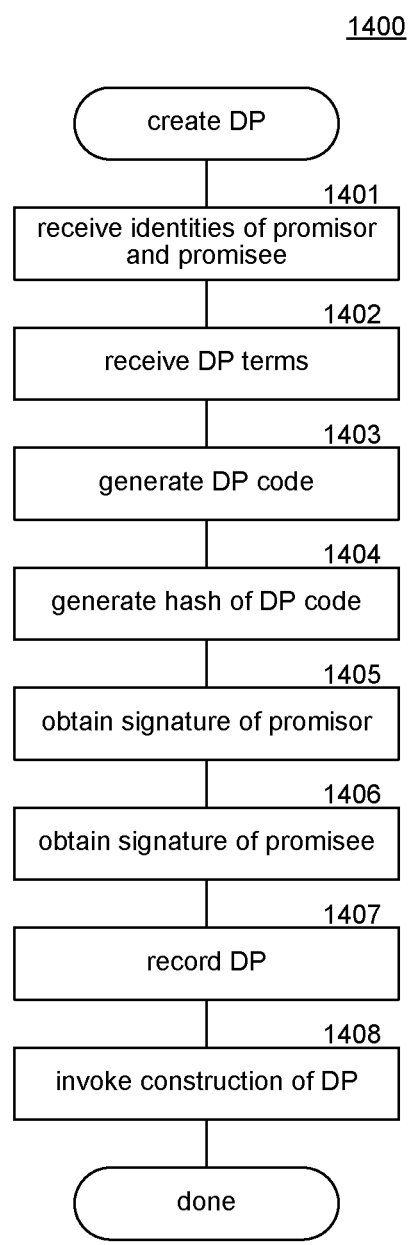
FIG. 14 is a flow diagram that illustrates the processing of a create digital promise component in some embodiments.

FIG. 14 is a flow diagram that illustrates the processing of a create digital promise component in some embodiments. A create digital promise component 1400 is invoked to create a digital promise. In block 1401, the component receives the identities of the promisor and the promisee. In block 1402, the component receives the terms of the digital promise. The data received in blocks 1401-1402 may be input via the display page of FIG. 5. In block 1403, the component generates the digital promise code. The digital promise code may be the same for all digital promises. Alternatively, different types of digital promises may have different digital promise code. For example, different types of digital promises may have different numbers of promisors and promisees. In block 1404, the component generates a hash of the digital promise code that includes the terms. In block 1405, the component obtains a signature of the promisor. In block 1406, the component obtains a signature of the promisee. In block 1407, the component records the digital promise including the digital promise code in the distributed ledger. In block 1408, the component invokes the constructor of the digital promise to initialize the digital promise and then completes.

Figure 15:
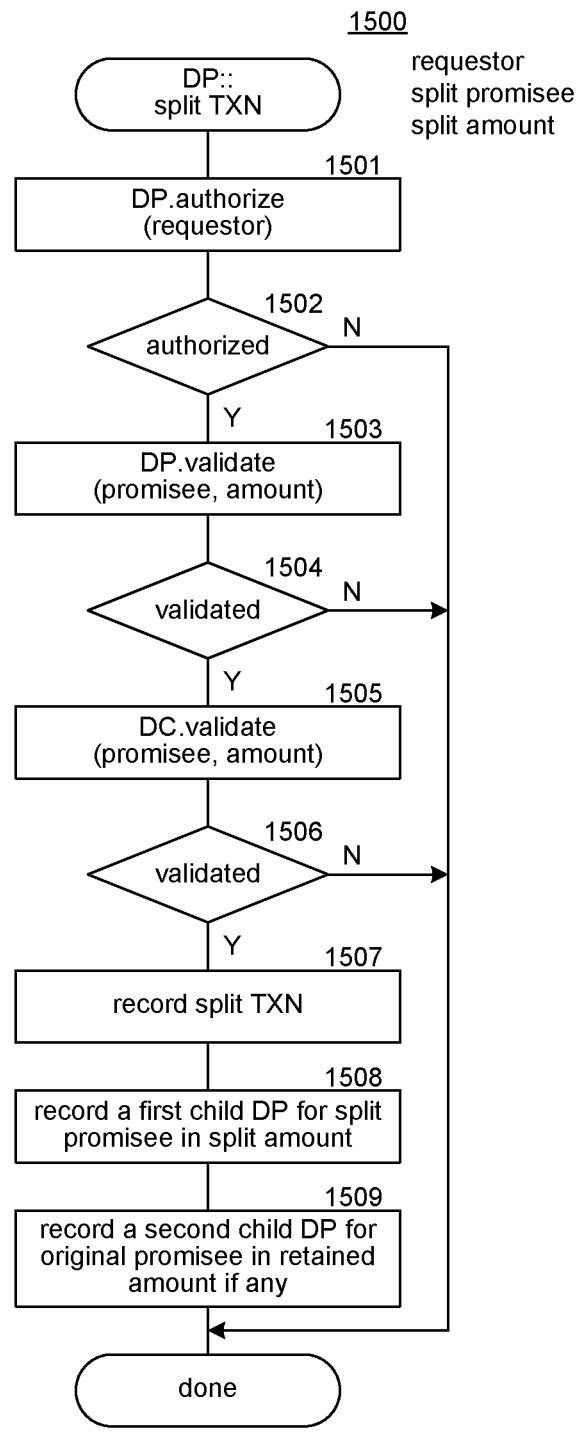
FIG. 15 is a flow diagram that illustrates the processing of a split transaction component of a digital promise in some embodiments.

FIG. 15 is a flow diagram that illustrates the processing of a split transaction component of a digital promise in some embodiments. A split transaction component 1500 is invoked to split the digital promise. In block 1501, the component invokes an authorize component of the digital promise to determine whether the requesting party is authorized. In decision block 1502, if authorized, then the component continues at block 1503, else the component completes. In block 1503, the component invokes a validate component of the digital promise to validate a split transaction for the split promisee in the split amount under the digital promise. In decision block 1504, if validated, then the component continues at block 1505, else the component completes. In block 1505, the component invokes a validate component of the digital contract to which the digital promise is linked to validate a split transaction for the split promisee if the split amount is valid under the digital contract. In decision block 1506, if validated, then the component continues at block 1507, else the component completes. In block 1507, the component records a split transaction, which may include generating the split transaction and obtaining signatures of the parties. In block 1508, the component records a first child digital promise with the split promisee in the split amount, which may include generating a create digital promise transaction and obtaining the signatures of the parties. In block 1509, the component records a second child digital promise with the original payee for the retained amount, if any. The child digital promises may have the same terms as their parent digital promise except for the promisee and amount. The component then completes.

Figure 16:
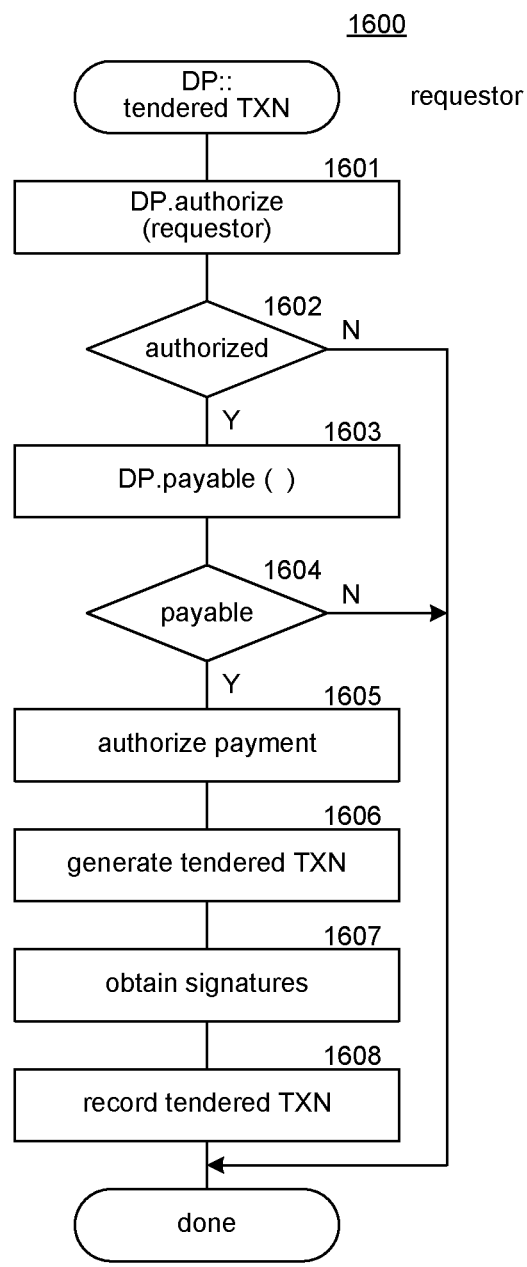
FIG. 16 is a flow diagram that illustrates the processing of a tendered transaction component of a digital promise in some embodiments.

FIG. 16 is a flow diagram that illustrates the processing of a tendered transaction component of a digital promise in some embodiments. A tendered transaction component 1600 is invoked when a promisee tenders a digital promise for payment. In block 1601, the component invokes an authorize component of the digital promise to determine whether the requesting party is authorized to record a digital transaction for the digital promise. In decision block 1602, if authorized, then the component continues at block 1603, else the component completes. In block 1603, the component invokes a payable component of the digital promise to determine whether the conditions of the digital promise are satisfied and the digital promise is payable. In decision block 1604, if payable, then the component continues at block 1605, else the component completes. In block 1605, the component may direct or authorize payment by the promisor to the promisee. In block 1606, the component generates a tendered transaction. In block 1607, the component obtains signatures of the promisor and the promisee. In block 1608, the component records the tender transaction and then completes.

Figure 17:
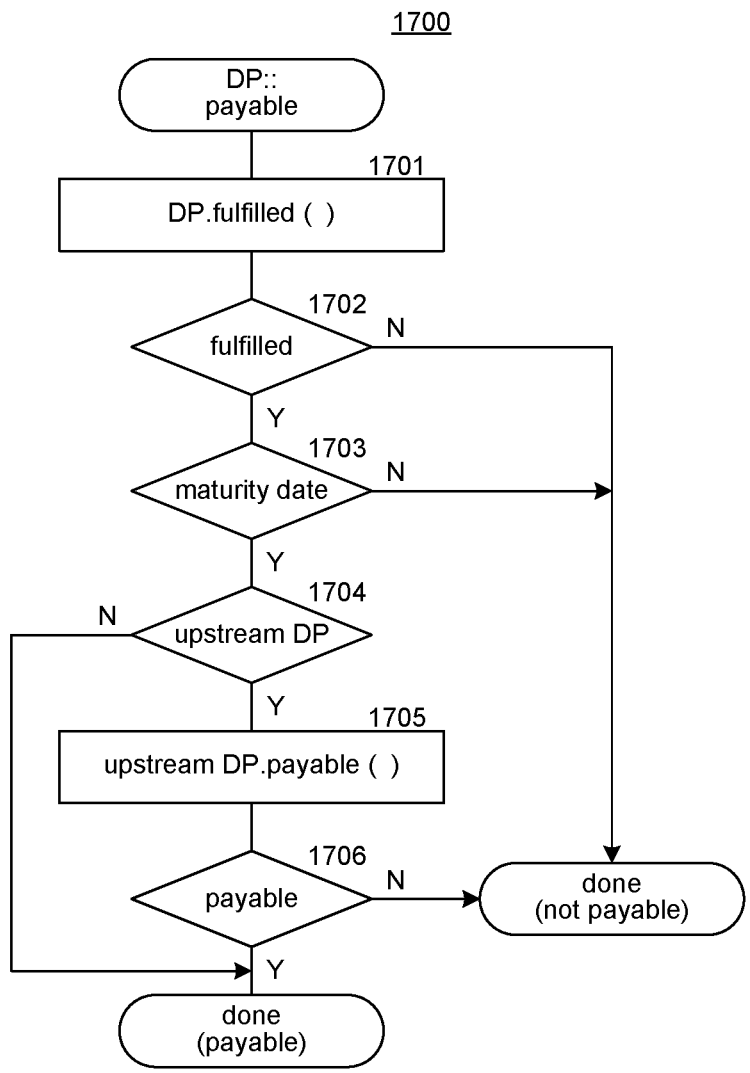
FIG. 17 is a flow diagram that illustrates the processing of a payable component of a digital promise in some embodiments.

FIG. 17 is a flow diagram that illustrates the processing of a payable component of a digital promise in some embodiments. A payable component 1700 is invoked to determine whether the digital promise is payable. In block 1701, the component invokes a fulfilled component of the linked digital contract. In decision block 1702, if the digital contract has been fulfilled, then the component continues at block 1703, else the component completes, indicating that the digital promise is not payable. In decision block 1703, if the maturity date of the digital promise has been reached, then the component continues at block 1704, else the component returns an indication that the digital promise is not payable. In decision block 1704, if the digital promise has an upstream digital promise, the component continues at block 1705, else the component returns an indication that the digital promise is payable. In block 1705, the component invokes the payable component of the upstream digital promise. That payable component in turn determines whether it is linked to a digital contract that has been fulfilled and whether its upstream digital promise is payable.

Thus, the payable component for every upstream digital promise is invoked. In decision block 1706, if the upstream digital promise is payable, then the component returns an indication that the digital promise is payable, else the component returns an indication that the digital promise is not payable.

The following paragraphs describe various embodiments of aspects of the SSDP system. An implementation of the SSDP system may employ any combination of the embodiments. The processing described below may be performed by a computing device with a processor that executes computer-executable instructions stored on a computer-readable storage medium that implements the SSDP system.

In some embodiment, a method performed by a computing system for securely executing transactions is provided. The method records in a ledger digital promise code of an original digital promise defining transactions relating to the original digital promise. The original digital promise is a promise of an original promisor to pay an asset to an original promisee. The method submits to the digital promise code of the original digital promise a split transaction to split the original digital promise into a first child digital promise and a second child digital promise. The first child digital promise is a promise to pay a first portion of the asset to a first child promisee, and the second child digital promise is a promise to pay a second portion of the asset to a second child promisee. Under control of the digital promise code, the method records in the ledger the first child digital promise and the second child digital promise. The method also records in the ledger a contract along with contract code defining transactions relating to the contract. The contract is between the original promisee and the first child promisee where payment for the contract is based on the first child digital promise. The method also submits to the contract code a fulfilled transaction to indicate that terms of the contract have been satisfied. Under control of the contract code, the method records in the ledger a fulfilled transaction indicating that the terms of the contract have been fulfilled such that the first child digital promise is not payable until after a fulfilled transaction for the contract is recorded in the ledger. In some embodiments, the method further submits to the contract code a link transaction to link the first child digital promise to the contract and, under control of the contract code, links the first child digital promise to the contract to indicate that payment for the contract is based on the first child digital promise. In some embodiments, the method further records in the ledger an original contract along with original contract code defining transactions relating to the original contract. The original contract is between the original promisor and the original promise, where payment for the original contract is based on the original digital promise. In some embodiments, the method further submits to the original contract code a link transaction to link the second child digital promise to the original contract to indicate a retained portion of the original digital promise. In some embodiments, the method further submits to the original contract code a fulfilled transaction to indicate that terms of the original contract have been satisfied and, under control of the original contract code, records in the ledger a fulfilled transaction indicating that the terms of the original contract have been fulfilled such that the second child digital promise is payable when the fulfilled transaction for the original contract is recorded in the ledger. In some embodiments, the first child digital promise is payable when both the fulfilled transaction for the original contract and the fulfilled transaction for the contract are recorded in the ledger. In some embodiments, the contract code and the digital promise code ensure that transactions are submitted by a user who is authorized to perform the transactions. In some embodiments, the ledger is a distributed ledger. In some embodiments, the contract code and the digital promise code are each part of a smart contract. In some embodiments, the asset is money. In some embodiments, a digital promise includes a maturity date such that no payments deriving from a digital promise will be made until the maturity date.

In some embodiments, a computing system for managing digital promises is provided. The computing system comprises one or more processors for executing computer-executable instructions and one or more computer-readable storage media that containing computer-executable instructions. When executed by the processor, the instructions control the computing system to record in a ledger original digital promise code for an original digital promise in which an original promisor promises to pay to an original promisee an asset when an original condition is satisfied. When executed by the processor, the instructions control the computing system to receive a request to split the original digital promise into a first child digital promise and a retained child digital promise. The first child digital promise is based on the original digital promise whereby the original promisor promises to pay on behalf of the original promisee a first portion of the asset to a first child promisee when the original condition and a first child condition of the first child digital promise are satisfied and the retained child digital promise being based on the original digital promise whereby the original promisor promises to pay to the original promisee only a retained portion of the asset when the original condition is satisfied. When executed by the processor, the instructions control the computing system to record in the ledger an indication of the split transaction. In some embodiments, the original condition is satisfied when a digital contract between the original promisor and the original promisee that is recorded in the ledger is recorded as having been fulfilled. In some embodiments, the first child condition is satisfied when a first child digital contract between the original promisee and the first child promisee that is recorded in the ledger is recorded as having been fulfilled. In some embodiments, the original digital promise includes a maturity date such that no payments deriving from the original digital promise will be made until the maturity date. In some embodiments, the instructions when executed further control the computing system to receive from the first child promisee a request to split the first child digital promise into a second child digital promise and a second retained child digital promise. The second child digital promise is based on the first child digital promise whereby the original promisee promises to pay on behalf of the first child promisee a second portion of the first portion of the asset to a second child promisee when the original condition, the first child condition, and a second child condition are satisfied, and the second retained child digital promise being based on the first child digital promise whereby the original promisor is to pay on behalf of the original promisee to the first child promisee only a second retained portion when the original condition and the first child condition are satisfied.

In some embodiments, a method performed by a computing system for distributing a digital promise down a supply chain is provided. The method records in a distributed ledger loan digital contract code of a loan digital contract between a lender and a borrower. The loan digital contract specifies terms under which the lender is to pay to the borrower an asset. One of the terms specifies that the loan digital contract is fulfilled when evidence of completion of manufacture of a product is provided to the lender. The method records in the distributed ledger lender digital promise code of a lender digital promise between the lender and the borrower whereby the lender promises to pay the asset to the borrower when the loan digital contract is fulfilled. The method records in the distributed ledger purchase digital contract code of a purchase digital contract between the borrower and a supplier. The purchase digital contract specifies terms under which the lender is to pay to the supplier a portion of the asset. One of the terms specifies that the purchase digital contract is fulfilled when evidence is provided that a component used in manufacturing the product has been supplied to the borrower. Under control of the lender digital promise code, the method records in the distributed ledger a split transaction to split the lender digital promise into a supplier portion of the asset and a borrower-retained portion of the asset. Under control of the purchase digital contract code, the method records in the distributed ledger a fulfilled transaction indicating that the purchase digital contract has been fulfilled. Under control of the loan digital contract code, the method records in the distributed ledger a fulfilled transaction indicating that the loan digital contract has been fulfilled whereby the borrower-retained portion of the asset is payable when the loan digital contract has been fulfilled and the supplier portion is payable when both the loan digital contract and the purchase digital contract are fulfilled.

In some embodiments, a method performed by a computing system for splitting a digital promise is provided. The method records in a distributed ledger an original digital promise indicating that an original promisor is to pay an original promisee an asset when an original condition is satisfied. The method records in the distributed ledger a first child digital promise indicating that the original promisor is to pay on behalf of the original promisee a first child promisee a first portion of the asset when the original condition is satisfied and a first child condition is satisfied and indicating that the original promisor is to pay the original promisee only a retained portion of the asset when the original condition is satisfied. If the original condition is satisfied prior to the recording of the first child digital promise, the original promisor is to pay to the original promisee the asset, and if the original condition is satisfied after the recording of the first child digital promise, the original promisor is to pay to the original promisee only the retained portion of the asset. In some embodiments, the original digital promise is linked to an original digital contract between the original promisor and the original promisee as payment for performance of the original digital contract and the first child digital promise is linked to a first child digital contract between the original promisee and the first child promisee as payment for performance of the first child digital contract.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, although a digital contract to which a digital promise is linked is described primarily in the context in which the digital contract and digital promise have at least one party in common, they need not have any parties in common. Accordingly, the invention is not limited except as by the appended claims.

The invention claimed is:

1. A method performed by a computing system for securely executing transactions, the method comprising:

recording in a ledger digital promise code of an original digital promise defining transactions relating to the original digital promise, the original digital promise being a promise of an original promisor to pay an asset to an original promisee;

submitting to the digital promise code of the original digital promise a split transaction to split the original digital promise into a first child digital promise and a second child digital promise, the first child digital promise to pay a first portion of the asset to a first child promisee and the second child digital promise to pay a second portion of the asset to a second child promisee;

under control of the digital promise code, recording in the ledger the first child digital promise and the second child digital promise;

recording in the ledger a contract along with contract code defining transactions relating to the contract, the contract being between the original promisee and the first child promisee where payment for the contract is based on the first child digital promise; and submitting to the contract code a fulfilled transaction to indicate that terms of the contract have been satisfied; and under control of the contract code, recording in the ledger a fulfilled transaction indicating that the terms of the contract have been fulfilled such that the first child digital promise is not payable until after a fulfilled transaction for the contract is recorded in the ledger.

2. The method of claim 1 further comprising submitting to the contract code a link transaction to link the first child digital promise to the contract and, under control of the contract code, linking the first child digital promise to the contract to indicate that payment for the contract is based on the first child digital promise.

3. The method of claim 1 further comprising recording in the ledger an original contract along with original contract code defining transactions relating to the original contract, the original contract being between the original promisor and the original promise, where payment for the original contract is based on the original digital promise.

4. The method of claim 3 further comprising submitting to the original contract code a link transaction to link the second child digital promise to the original contract to indicate a retained portion of the original digital promise.

5. The method of claim 3 further comprising submitting to the original contract code a fulfilled transaction to indicate that terms of the original contract have been satisfied and, under control of the original contract code, recording in the ledger a fulfilled transaction indicating that the terms of the original contract have been fulfilled such that the second child digital promise is payable when the fulfilled transaction for the original contract is recorded in the ledger.

6. The method of claim 5 wherein the first child digital promise is payable when both the fulfilled transaction for the original contract and the fulfilled transaction for the contract are recorded in the ledger.

7. The method of claim 1 wherein the contract code and the digital promise code ensure that transactions are submitted by a user who is authorized to perform the transactions.

8. The method of claim 1 wherein the ledger is a distributed ledger.

9. The method of claim 1 wherein the contract code and the digital promise code are each part of a smart contract.

10. The method of claim 1 wherein the asset is money.

11. The method of claim 1 wherein a digital promise includes a maturity date such that no payments deriving from a digital promise will be made until the maturity date.

12. A computing system for managing digital promises, the computing system comprising:

a processor for executing computer-executable instructions; and a computer-readable storage medium containing computer-executable instructions that when executed by the processor control the computing system to:

record in a ledger original digital promise code for an original digital promise in which an original promisor promises to pay to an original promisee an asset when an original condition is satisfied;

receive a request to split the original digital promise into a first child digital promise and a retained child digital promise, the first child digital promise being based on the original digital promise whereby the original promisor promises to pay on behalf of the original promisee a first portion of the asset to a first child promisee when the original condition and a first child condition of the first child digital promise are satisfied and the retained child digital promise being based on the original digital promise whereby the original promisor promises to pay to the original promisee only a retained portion of the asset when the original condition is satisfied; and record in the ledger an indication of the split transaction.

13. The computing system of claim 12 wherein the original condition is satisfied when a digital contract between the original promisor and the original promisee that is recorded in the ledger is recorded as having been fulfilled.

14. The computing system of claim 13 wherein the first child condition is satisfied when a first child digital contract between the original promisee and the first child promisee that is recorded in the ledger is recorded as having been fulfilled.

15. The computing system of claim 13 wherein the original digital promise includes a maturity date such that no payments deriving from the original digital promise will be made until the maturity date.

16. The computing system of claim 12 wherein the computer-executable instructions when executed further control the computing system to receive from the first child promisee a request to split the first child digital promise into a second child digital promise and a second retained child digital promise, the second child digital promise being based on the first child digital promise whereby the original promisee promises to pay on behalf of the first child promisee a second portion of the first portion of the asset to a second child promisee when the original condition, the first child condition, and a second child condition are satisfied, and the second retained child digital promise being based on the first child digital promise whereby the original promisor is to pay on behalf of the original promisee to the first child promisee only a second retained portion when the original condition and the first child condition are satisfied.

17. A method performed by a computing system for distributing a digital promise down a supply chain, the method comprising:

recording in a distributed ledger loan digital contract code of a loan digital contract between a lender and a borrower, the loan digital contract specifying terms under which the lender is to pay to the borrower an asset, one of the terms specifying that the loan digital contract is fulfilled when evidence of completion of manufacture of a product is provided to the lender;

recording in the distributed ledger lender digital promise code of a lender digital promise between the lender and the borrower whereby the lender promises to pay the asset to the borrower when the loan digital contract is fulfilled;

recording in the distributed ledger purchase digital contract code of a purchase digital contract between the borrower and a supplier, the purchase digital contract specifying terms under which the lender is to pay to the supplier a portion of the asset, one of the terms specifying that the purchase digital contract is fulfilled when evidence is provided that a component used in manufacturing the product has been supplied to the borrower;

under control of the lender digital promise code, recording in the distributed ledger a split transaction to split the lender digital promise into a supplier portion of the asset and a borrower-retained portion of the asset;

under control of the purchase digital contract code, recording in the distributed ledger a fulfilled transaction indicating that the purchase digital contract has been fulfilled; and under control of the loan digital contract code, recording in the distributed ledger a fulfilled transaction indicating that the loan digital contract has been fulfilled;

whereby the borrower-retained portion of the asset is payable when the loan digital contract has been fulfilled and the supplier portion is payable when both the loan digital contract and the purchase digital contract are fulfilled.

18. A method performed by a computing system for splitting a digital promise, the method comprising:

recording in a distributed ledger an original digital promise indicating that an original promisor is to pay an original promisee an asset when an original condition is satisfied; and recording in the distributed ledger a first child digital promise indicating that the original promisor is to pay on behalf of the original promisee a first child promisee a first portion of the asset when the original condition is satisfied and a first child condition is satisfied and indicating that the original promisor is to pay the original promisee only a retained portion of the asset when the original condition is satisfied, such that if the original condition is satisfied prior to the recording of the first child digital promise, the original promisor is to pay to the original promisee the asset, and if the original condition is satisfied after the recording of the first child digital promise, the original promisor is to pay to the original promisee only the retained portion of the asset.

19. The method of claim 18 wherein the original digital promise is linked to an original digital contract between the original promisor and the original promisee as payment for performance of the original digital contract and the first child digital promise is linked to a first child digital contract between the original promisee and the first child promisee as payment for performance of the first child digital contract.

* * * * *